United States Patent
Mullikin et al.

(10) Patent No.: US 7,852,226 B2
(45) Date of Patent: Dec. 14, 2010

(54) SPECTROSCOPIC PORTAL FOR AN ADAPTABLE RADIATION AREA MONITOR

(75) Inventors: John Mullikin, Henderson, TX (US); Thomas E. Saunders, Goleta, CA (US)

(73) Assignee: Textron Systems Corporation, Wilmington, MA (US)

( * ) Notice: Subject to any disclaimer, the term of this patent is extended or adjusted under 35 U.S.C. 154(b) by 427 days.

(21) Appl. No.: 11/771,068

(22) Filed: Jun. 29, 2007

(65) Prior Publication Data

US 2008/0191887 A1 Aug. 14, 2008

Related U.S. Application Data

(60) Provisional application No. 60/806,325, filed on Jun. 30, 2006.

(51) Int. Cl.
*G08B 17/12* (2006.01)
(52) U.S. Cl. .................................... 340/600; 250/336.1
(58) Field of Classification Search ................. 340/600; 250/336.1
See application file for complete search history.

(56) References Cited

U.S. PATENT DOCUMENTS

| | | | |
|---|---|---|---|
| 6,768,421 B1 * | 7/2004 | Alioto et al. | 340/600 |
| 7,550,738 B1 * | 6/2009 | DeVito | 250/393 |
| 2004/0195517 A1 * | 10/2004 | Rowland et al. | 250/370.15 |
| 2005/0023477 A1 | 2/2005 | Archer et al. | |
| 2006/0284094 A1 * | 12/2006 | Inbar | 250/359.1 |
| 2008/0023631 A1 * | 1/2008 | Majors et al. | 250/336.1 |

* cited by examiner

*Primary Examiner*—George A Bugg
*Assistant Examiner*—Kerri McNally
(74) *Attorney, Agent, or Firm*—Felix L. Fischer (57) ABSTRACT

A detection system operating on a scalable Radiation Sensor Unit (RSU) data stream employs a detection module triggering an alarm based on fee dynamic temporal features of gross count. Two spectroscopic buffers, one holding a long-term background and one holding the integrated detection event data are passed on for identification. The detector data incorporates sets of counts measured at channelized gamma energies. Each multi-channel data set is reduced to highly accurate peak locations. The absolute energy of the peaks is determined using innovative techniques and the background peaks and other secondary peaks are eliminated to provide a concise list of corrected source peak locations and intensities. This, together with spectral region analysis results is used with pattern recognition algorithms to identify fee source isotope or combination of isotopes from a standard library.

17 Claims, 7 Drawing Sheets

SPECTROSCOPIC PORTAL FOR AN ADAPTABLE RADIATION AREA MONITOR

REFERENCE TO RELATED APPLICATIONS

This application claims priority of provisional application Ser. No. 60/806,325 filed on Jun. 30, 2006, having the same title as the present application, the disclosure of which is incorporated herein by reference as though fully set forth.

BACKGROUND OF THE INVENTION

1. Field of the invention

The present invention relates to radiation detection systems. More particularly the present invention relates to an enhanced adaptable and portable radiation detection system with improved source identification employing a spectroscopic portal with precision peak analysis, real time detector energy calibration, spectral region analysis and background correction to detect radiation sources moving at road speeds with short data acquisition windows.

2. Description of the Related Art

The requirement for detecting small amounts of radioactive material, such as special nuclear material (SNM) and shielded highly enriched uranium (HEU), especially in environments where the source may be moving by vehicular, cargo or human transport is becoming critical. Monitoring of ports, major highways and local street and pedestrian traffic is required in certain locations. Moreover there is a need to identify unknown radioactive material by its spectral signature when detected.

To provide sufficient monitoring capability, cost effective radiation detection systems must be available. These systems must be able to monitor large volumes of moving traffic with systems that are robust and easily maintained yet provide reliable detections of low levels of radiation.

SUMMARY OF THE INVENTION

The present invention provides a detection system operating on a scalable Radiation Sensor Unit (RSU) data stream with a detection module triggering an alarm based on the dynamic temporal features of gross count. Two spectroscopic buffers, one holding a long-term background and one holding the integrated detection event data are passed on for identification. The detector data consists of sets of counts measured at channelized gamma energies. Each multi-channel data set is reduced to highly accurate peak locations. The absolute energy of the peaks is determined using innovative techniques and the background peaks and other secondary peaks are eliminated to provide a concise list of corrected source peak locations and intensities. This, together with spectral region analysis results is used with pattern recognition algorithms to identify the source isotope or combination of isotopes from a standard library.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The embodiment of the present invention disclosed herein has a real-time count report rate often measurements per second which is used to transfer detector data for analysis. The threat identification algorithms presented herein work with any realistic acquisition rate (once per minute to 10,000 times per second) in alternative embodiments.

Figure 1:
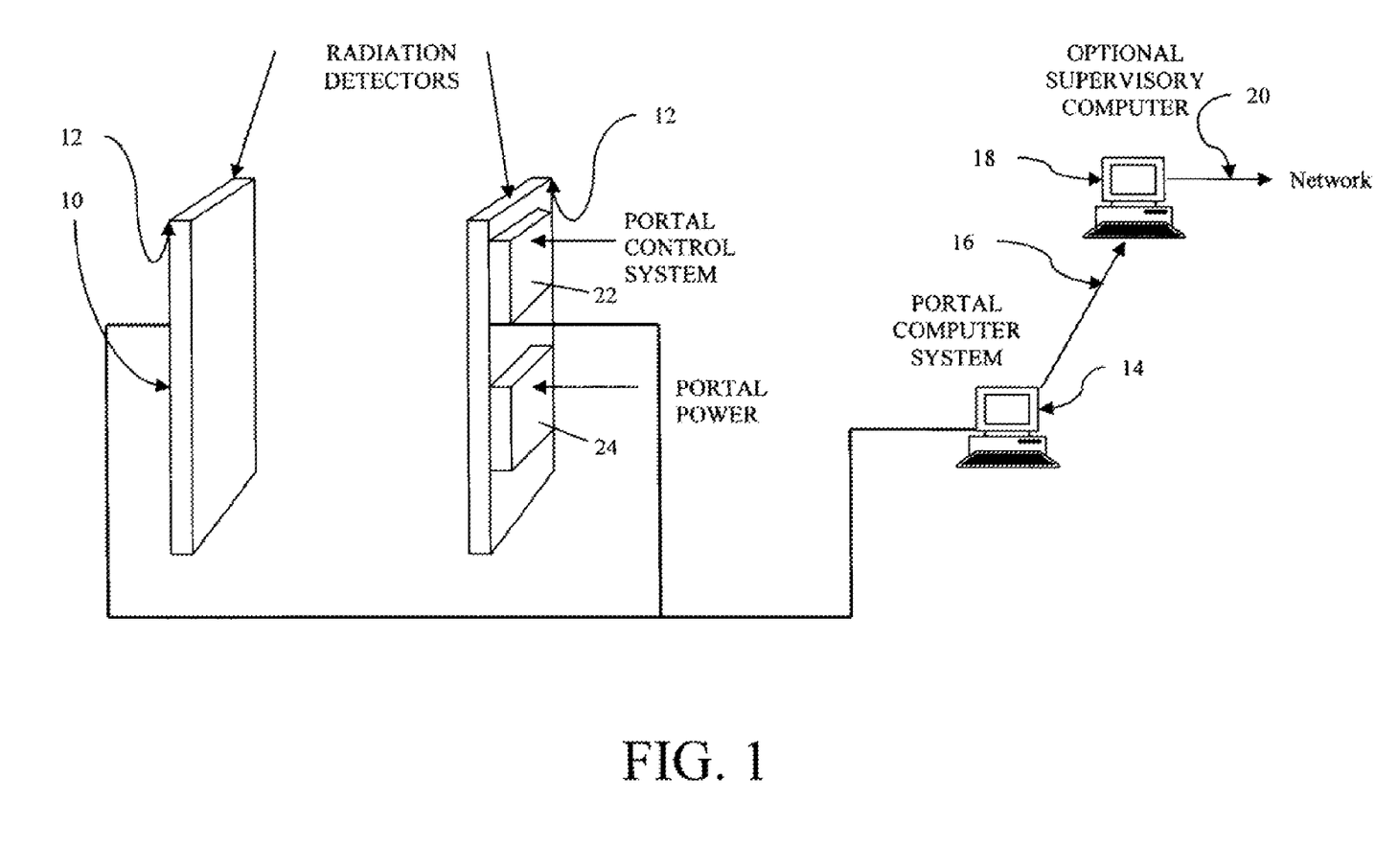
FIG. 1 is a pictorial view of hardware elements of a system employing the present invention.

The basic physical system employed in an embodiment of the present invention is shown in FIG. 1. Support structure elements 10 are provided adjacent a highway, rail line or other traffic path which support RSU sensors 12. A computer data acquisition and computation system (PCS) 14 is mounted to the support structure or remotely, as required, to process the data from the RSUs. The PCS provides an output 16 for communication to a supervisor station 18 or network 20 for multiple sensor systems as well as other remote display or alarm consoles. For reference, a portal control system 22 and portal power system 24 are shown.

Figure 2:
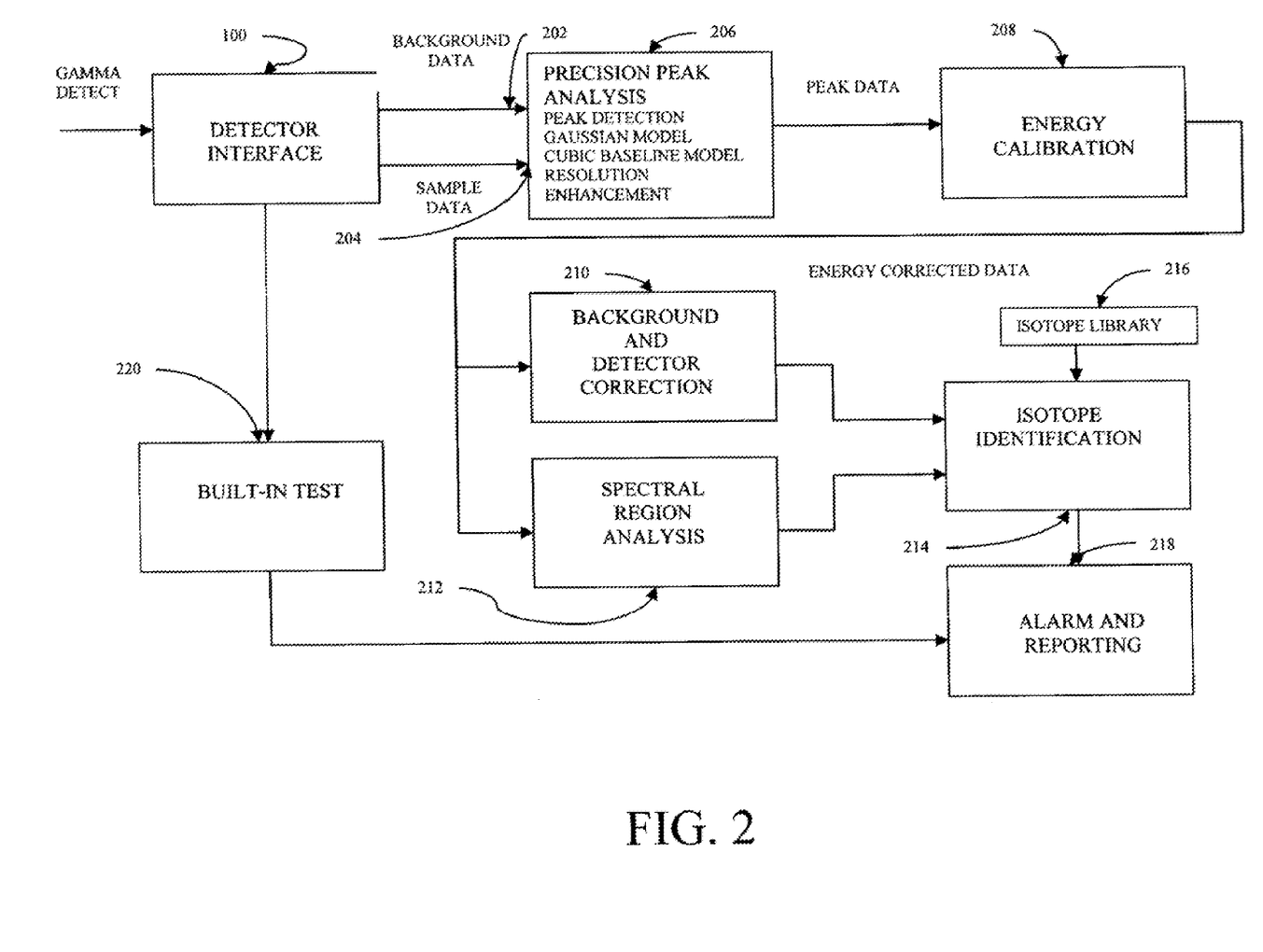
FIG. 2 is a block diagram of the elements of the spectroscopic portal data analysis.

For the embodiment described herein, a Sodium Iodide (NaI) detector is employed. The data interface is based on a time sliced spectral acquisition of 100 msec time bins. For the embodiment discussed herein, 1024 channel data sets are employed. As shown in FIG. 2, the absolute energy of the peaks is determined, as will be described subsequently, and the background peaks and other secondary peaks are eliminated through energy calibration relative to background Naturally Occurring Radioactive Materials (NORM) 208 and background correction 210 to provide a concise list of corrected source peak locations and intensities. This, together with spectral region analysis 212 results is used with pattern recognition algorithms to conduct isotope identification of 214 the source isotope or combination of isotopes from a standard library 216. For the purposes of this invention description, the term "isotope" is equivalent with the more exact term of "radio-nuclide". Alarming criteria are applied 218 and an alarm output is made to one or more computers.

The precision peak location algorithms do not depend on sensor resolution and can be applied without modification in alternative embodiments employing future detectors such as xenon for example. Further, peak locations are not sensitive to fluctuating unpredictable background, as is the case with moving traffic which adds to the robustness and low false alarm rate of the system. Although the intensity may shift, the energy of the source (and background) line emissions are fixed and provide a stable signature metric. Shape sensitive algorithms, discussed subsequently in detail, detect fully overlapping, unresolved peaks. The shape matching algorithms locate peak centers very accurately, independent of the resolution spread of the detector system. Data is fully reduced prior to ID/pattern recognition which speeds execution for high thoughput.

Peak analysts is not used exclusively. In the high energy region of the spectrum where Compton scattering dominates the signature, area/curve matching techniques augment the peak approach since up to 95% of the source signature may result in Compton scattering. In this case, spectral region analysis is employed to match an unknown isotope to a set of reference isotopes.

As shown in FIG. 2, the Threat Identification phase is initiated after a radiation detection event has occurred as determined by the detection software module. The Identification phase analyzes the gamma data from the detector and determines which isotope(s) in the library are responsible for the gamma signature. The analysis phase provides a high level of security against unknown threats in that an isotope that is not found in the library is processed as "UNKNOWN ISOTOPE". The peak location is reported for this case to aid in identification. Innocent radioactive materials are suppressed, innocent radioactive materials generally result in a suppressed alarm because the threat identification categorizes the material as a non-threat. An example of a non-threat is $^{40}K$. This material is not a threat unless the radiation level is very high (more than 10 millirem emission at 1 meter). However, any radioactive isotope of sufficient strength to be considered a threat is reported.

The data obtained from the radiation event for the embodiment disclosed includes up to eight seconds of source data combined with approximately five minutes of background data. The acquisition lime of eight seconds is typical, but in alternative embodiments, any realistic time is applicable (1 millisecond to 1 hour). Peak analysis of the source data and the background data are processed separately. The background data is used to provide accurate real-time detector energy calibration.

Figure 5:
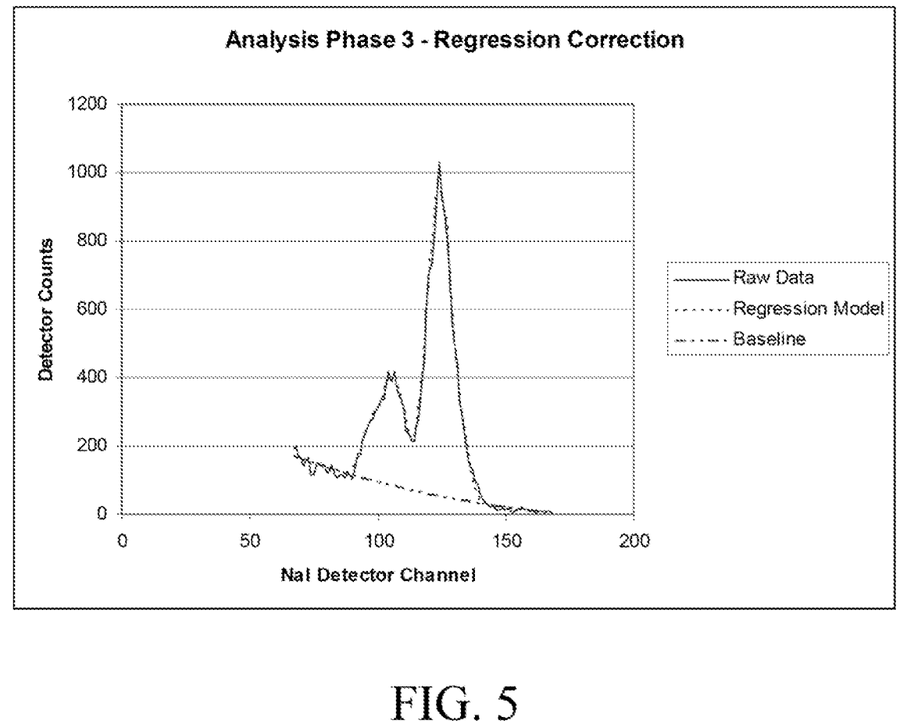
FIG. 5 is an additional graph of exemplary data of $^{133}$Barium for Analysis Phase 3, Regression Correction.

Peak detection is based on a Gaussian model of the NaI detector response Shape analysis is performed to verify this model and to detect peaks that are not resolved by the NaI detector. In testing of an exemplary embodiment of the invention, the precision peak analysis procedure can correctly identify all four peaks from the 133Barium unresolved doublet. As shown in FIG. 5, the embodiment not only identified the poorly resolved doublet, it also detected peaks at 276.40, 302.85, 356.00, and 383.85 keV.

Figure 6:
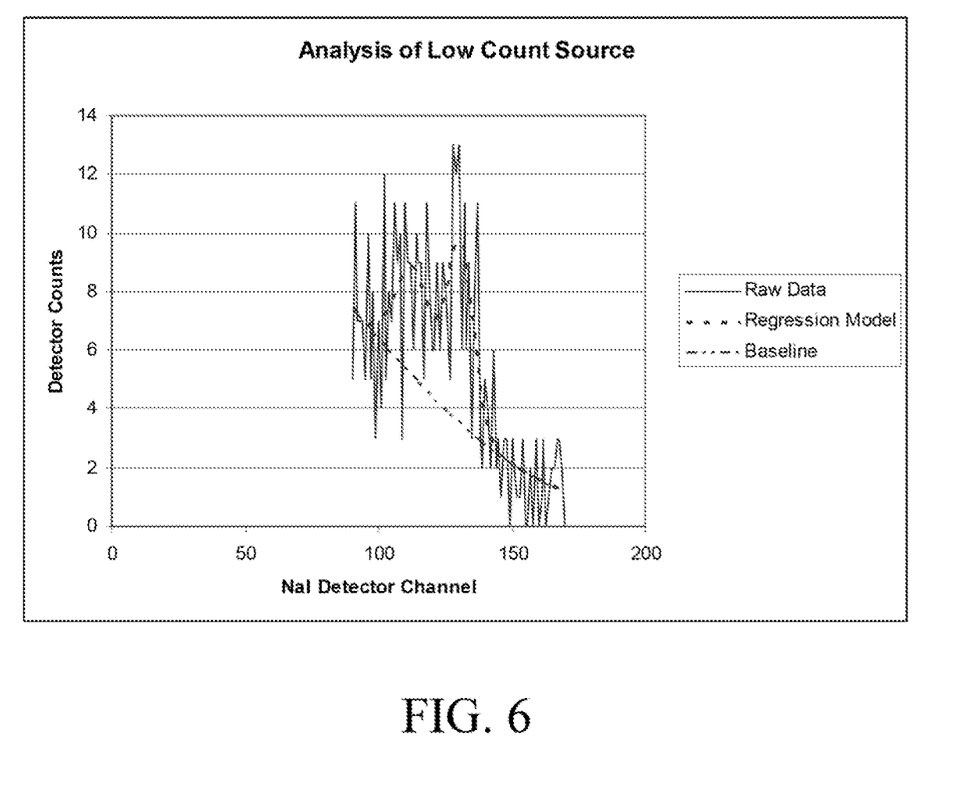
FIG. 6 is a graph of exemplary data of low detection count $^{133}$Barium.
Figure 7:
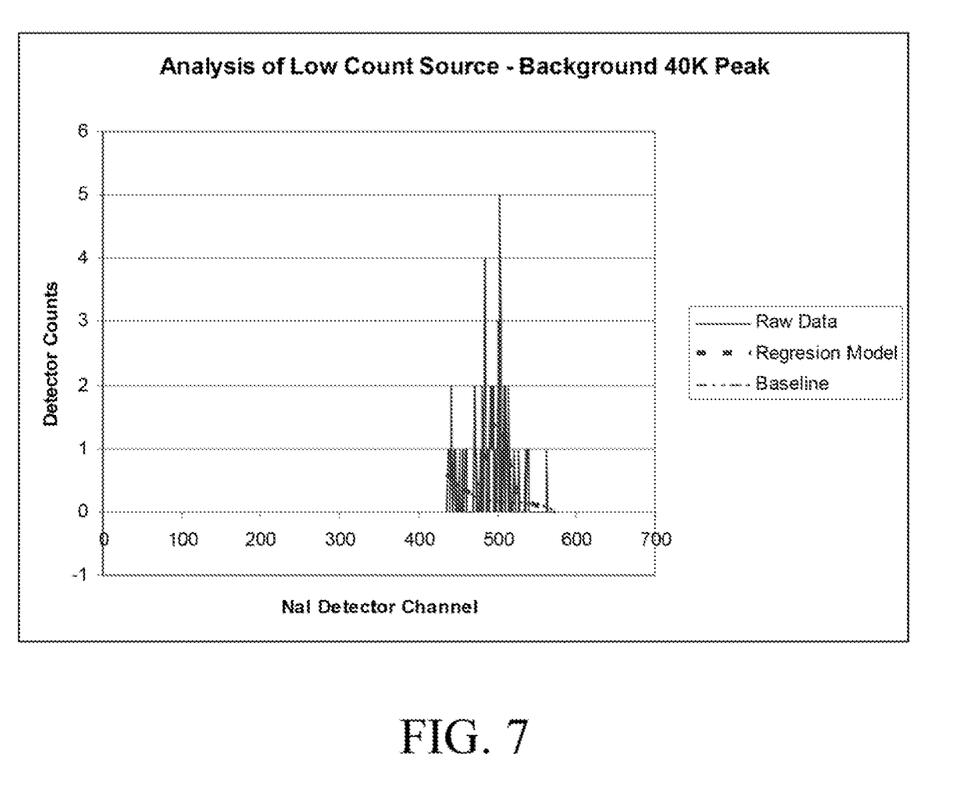
FIG. 7 is a graph of exemplary data for low detection count $^{40}$Potassium from naturally occurring background radiation.

The Peak Search phase begins with an initial detection of peaks. Peak detection is determined by use of a filtered second order derivative using a modified Mariscotti method. The Mariscotti method also allows for discrimination of peaks versus noise by the use of the standard deviation of the second derivative. The original Mariscotti method is modified in the present invention to provide better detection response for NaI detectors. NaI detectors have a variable resolution that ranges from about 12% at low energies to 4% at high energies. Optimal peak detection requires that the filter width match the detector resolution. The Mariscotti method is suitable for semiconductor detectors, but the fixed width of this method results in loss of sensitivity or extraneous peak detection. The 'Top-Hat' filter method permits variable width, but the shape of the filter does not match the detector Gaussian response. A modified Mariscotti filter that matches the Gaussian response of the detector while providing a variable filter width capability is employed in the embodiment of the present invention. The filter resolution tracks the detector resolution characteristic. The tracking is achieved by employing multiple filters that have different resolution. This method has been shown to accurately detect small peaks even in high background regions of the spectrum for the embodiments described herein. FIGS. 6 and 7 provide data for an actual example of this method. In the FIG. 6 example, a peak at channel 109 was detected that consisted of only 10 counts of total area. FIG. 7 shows another example of low-level peak detection with $^{40}$Potassium background peak present in the sample dataset.

Once peaks are initially determined, the peak location is refined by successive calculation and modeling algorithms. The first approximation is the peak centroid obtained by performing a centroid calculation using the peak start and end channels from the filtered second derivative zero crossings. The peak location is further refined by nonlinear regression techniques based on a Gaussian model as described below.

Peak analysis requires intelligent selection of spectrum subsets to process peaks. The subset selection phase takes groups of unresolved or poorly resolved peaks along with an adequate amount of baseline on each side of the peaks. The amount of baseline on each side of a peak is typically the width (FWHM) of the nearest peak. This value is reduced if another peak interferes with the baseline. The interference is tested by examining nearby peaks and using a Gaussian peak approximation to reduce the calculated interference to less than 4% of the baseline value.

The peak selection is based on the detected peak positions and the fixed energy resolution response of NaI. The intensity, position, and width of neighboring peaks are also considered to ensure that the baseline is not contaminated by peaks not in the current subset.

Figure 3:
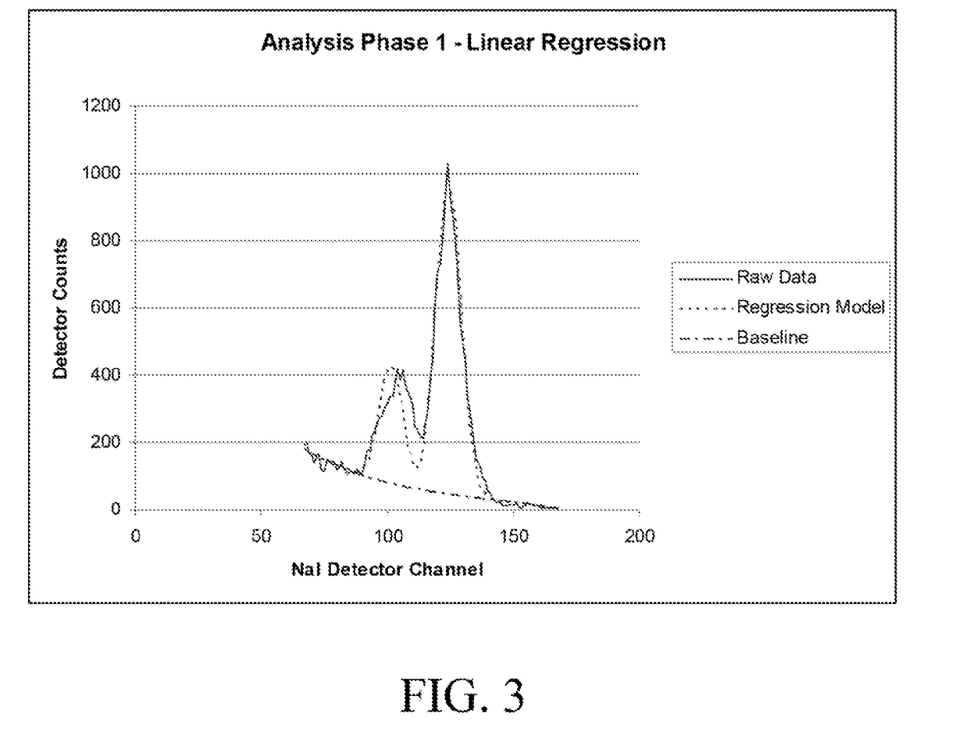
FIG. 3 is a graph of exemplary data of $^{133}$Barium for Analysis Phase 1, Linear Regression.

A linear regression model based on Gaussian distributions is performed on each subset to obtain an initial estimate of the peak intensity and to determine the baseline. A cubic polynomial model is used for the baseline approximation. The cubic model is optimum because it follows actual detector asymmetric response under a peak while providing a low number of parameters for noise filtering. FIG. 3 shows an example of this phase of analysis as applied to a $^{133}$Barium source. The linear regression step is applied four times in the embodiment of the invention disclosed herein.

The purpose of the multiple regression steps is to get an accurate baseline and peak model that does not attempt to include peak residuals in the baseline model. The inclusion of peak residuals in the baseline model occurs when the Gaussian model does not match the actual data. This occurs when the NaI detector does not resolve peaks such as the $^{133}$Barium 276.4/302.85 peak and the 356.0/383.85 keV peak. The difference between these is the weights applied to the baseline. The baseline weight applied in the present invention is the reciprocal of the sum of the peak intensities up to a maximum value. The linear regression steps are a (1) a Low-weighted baseline; (2) a peak model computed with the low-weighted baseline; (3) a High-weighted baseline; and (4) a peak model computed with the high-weighted baseline.

An estimated signal to noise ratio is computed by dividing the smallest peak from Step 2 by the computed standard deviation, of the baseline residuals computed from Step 3. If the signal to noise ratio is low, the baseline model from Step 1 is used with the peak model from Step 2. If the signal to noise ratio exceeds a predetermined threshold, the baseline computed in Step 3 is used with the peak model from Step 4. If the signal to noise ratio is greater than 5, the threshold for the current embodiment, the higher weighted set is used. This procedure ensures that a higher weighting factor does not eliminate a low-intensity peak.

Figure 4:
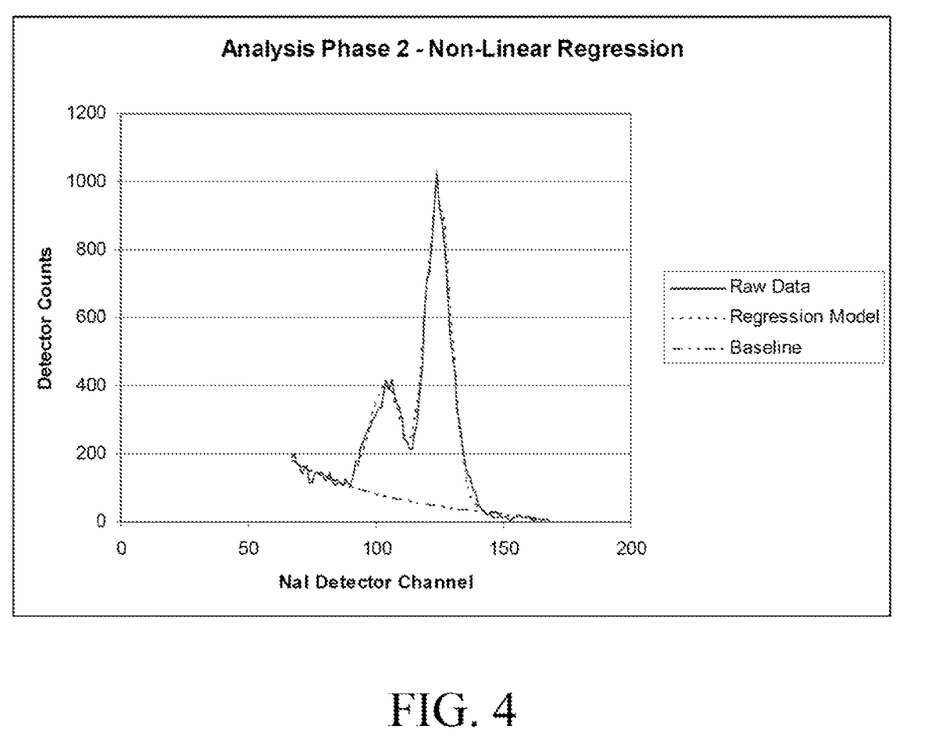
FIG. 4 is a graph of exemplary data of $^{133}$Barium for Analysis Phase 2, Non-Linear Regression.

The linear regression stage is followed by the non-linear regression phase. Non-linear regression uses the baseline computed by the linear regression phase. The peak amplitude, location, and width of each peak are allowed to change in the non-linear phase. The non-linear phase is not used initially because it requires a reasonably accurate initial model in order to ensure stability. The Marquart-Levenberg algorithm is used in the embodiment of the present invention for non-linear regression. FIG. 4 shows an example of this phase of analysis.

Peak shape analysis is performed after non-linear regression. The residuals are summed on the shoulders of each peak. If the sum of the residuals exceeds a fraction of the peak area, a mismatch to the Gaussian model is detected and the model is corrected to add additional peaks. The location of the additional peaks is determined by computing the centroid of the residuals. The analysis phase is sent back to the linear regression step with the additional peaks. FIG. 5 shows an example of this phase of analysis.

The peak location is determined from the non-linear regression phase. The advantage of this is that the full area of the peak is used to determine the exact location. Exemplary tests on an embodiment of the invention have shown standard deviations of peak precision as shown in Table 1.

TABLE 1

| Peak Precision Std Dev | Source Amplitude | Test Conditions |
| --- | --- | --- |
| 0.6% | Below Detection Threshold | 42 trials of $^{137}$Cs |
| 0.4% | At Detection Threshold | 47 trials of $^{57}$Co |
| 0.3% | Three times Detection Threshold | 24 trials of $^{57}$Co |

The peak area is computed by the Gaussian area formula with the measured amplitude and peak width.

The precision peak algorithms provide the foundation of a reliable and operationally proven solution to threat material identification and Naturally Occurring Radioactive Material (NORM) discrimination using a medium resolution detector. As shown, a precision of <0.5% is currently achieved in the installed operational environment. The data format is highly condensed and provides simplification to the identification process, it also allows for a calibration technique which utilizes the ratio of peak energies as a temperature insensitive feature metric.

The present invention provides real-time calibration of the gamma NaI detector energy response that compensates for the effects of temperature and dramatically improves the identification process. Taking advantage of the fact that some NORM will always be present in the background, a temperature invariant feature metric is used to identify specific peaks in the measured signature against the standard energy listed for those peaks in the isotope library. Therefore no temperature control or temperature monitoring is required and further, it compensates for any subtle temperature gradients within the crystal and requires no additional hardware.

The NaI gamma detection crystal has a temperature drift of approximately −0.3%/degree C. The photomultiplier tube also has a temperature drift of approximately −0.4%/degree C. This results in the gamma detector being four times more temperature sensitive than a mercury thermometer. Accurate isotope identification requires calibration accuracy better than 1%. The temperature sensitivity and calibration accuracy requirement pose a difficult challenge considering that the system is expected to operate over the range of −40° C. to +50° C.

Accurate calibration is achieved by using a background reference of naturally occurring radiation sources. For an exemplary embodiment, the background radiation is slightly increased by the use of a very small amount of $^{232}$Thorium in the form of a two inch piece of welding rod. The added $^{232}$Thorium does not affect the sample detection but does provide better counting statistics for a five-minute background.

Peak locations and areas are determined by applying the Precision Peak Analysis algorithms on the set of background data. The first phase of calibration is the determination of an approximate 'pre-calibration'. The purpose of the pre-calibration step is to permit identification of background reference peaks. The pre-calibration is performed by pattern recognition of the background peaks. This is performed by analyzing ratios of peaks. Since the calibration drift has the nature of a linear drift or 'gain' parameter, the unknown linear value is cancelled by the application of peak ratios.

TABLE 2

| Reference | Peak |
| --- | --- |
| $^{228}$Actinium/$^{214}$Pb | 343.76 keV |
| Annihilation Energy | 511 keV |
| $^{208}$Tl($^{232}$Th) | 583.13 keV |
| $^{40}$K | 1460.83 keV |
| $^{214}$Bi($^{238}$U) | 1786.47 keV |
| $^{208}$Tl($^{232}$Th) | 2614.47 keV |

The above energy values are modified for NaI response when the reference contains more than one peak.

Reference peaks must have at least 300 counts and must be within an energy tolerance threshold that varies with reference if they are to be considered for the calibration.

A weighted least-squares fit is performed to obtain the calibration parameter. The weighting parameter is the square root of the counts.

The non-linear response energy response of NaI is handled by applying a cubic polynomial model to a table of calibration values.

Table 3 contains exemplary field results of the measurement accuracy of the $^{235}$Uranium 185.72 keV peak by two embodiments of the invention. Detector 1 had an average error of 0.28 keV for a 185.72 keV peak (0.15% error) and Detector 2 had an average error of 1.00 keV for a 185.72 keV peak (0.54% error).

TABLE 3

| Detector 1 $^{235}$U (KEV) | Detector 1 Error (KEV) | Detector 2 $^{235}$U (KEV) | Detector 2 Error (KEV) |
| --- | --- | --- | --- |
| 185.5 | −0.22 | 184.91 | −0.81 |
| 185.96 | 0.24 | 184.14 | 1.58 |
| 186.20 | 0.48 | 185.06 | −0.66 |
| 186.38 | 0.66 | 184.61 | −1.11 |
| 186.14 | 0.42 | 185.07 | −0.65 |
| 185.83 | 0.21 | 184.53 | −1.19 |
| Average 186.00 keV | Average Error 0.28 keV | Average 184.72 keV | Average Error −1.00 keV |

The technique described allows real-time calibration of the gamma NaI detector energy response and compensates for the effects of temperature. This dramatically improves the identification process. Therefore no temperature control or temperature monitoring is required and further, it compensates for any subtle temperature gradients within the crystal and requires no additional system hardware.

The operational algorithms of the described embodiment of the present invention not only remove the background from consideration in the source identification process, but also remove secondary and sympathetic emissions caused by the source interaction with material in the RSP and other processes. This provides for a robust source identification using an uncorrupted list of source peak data.

First, the background radiation must not be considered during isotope identification. Background radiation is subtracted by reducing the area of each sample peak by the area of a corresponding background peak, adjusted by the ratio of the corresponding integration times.

Even with the background subtracted, the gamma energy can be contaminated by processes other than the signature of the source isotopes. The present invention implements models of each of these processes to eliminate the contamination from: 1) shielding, 2) backscatter, 3) double escapes, 4) Compton edges, and 5) coincidence.

The lead shielding near the detector has an X-ray peak near 85 keV. The use of a z-graded shield would remove most of this radiation but will cause an increase in the backscatter peak. The expected intensity of the lead X-ray peak is calculated from the intensity and energy of other peaks.

The backscatter peak from the shield occurs around 190 to 250 keV. The expected location and intensity of this peak is calculated from other peaks. The observed backscatter peak area is reduced by this amount.

Single and double escape peaks can occur for higher energy sources so the spectrum peaks are checked for escape peaks and the peak intensity is adjusted.

The initial peak filter contains a shape discriminator to prevent the inclusion of Compton edges in the table of peaks. A second test is performed during the peak correction phase. This test checks for Compton edges by calculating the expecting location and adjusting the peak area based on a mathematical model of this process.

Coincidence sum peaks can occur for higher intensify sources. A test is performed for coincidence peaks and the spectrum peak table is adjusted. Having corrected for each of these factors, a refined and consolidated and uncorrupted list of source peaks is then used for isotope identification.

To augment the peak-based identification algorithms, spectral region analysis is used for identification of isotopes with higher energies. This provides a more robust identification where the NaI detector resolution is otherwise lower. An analysis of a $^{238}$Uranium sample indicated that only 4% of the total detector response was photo-peaks. The major detector response was Compton scattering.

Spectral region analysis is performed by comparing the measured spectral response to a set of reference spectra. The spectrum is segmented to a number of channels. The number of channels and the width of each channel is based on the detector resolution. The number of channels for a NaI detector is approximately 100. The width of each channel is calculated so that each channel has the same significance based on detector resolution. This is accomplished by integrating the reciprocal of the detector's resolution function. The measured spectrum is converted from the original number of channels to the number of channels for spectral region analysis. A multiple linear regression analysis is used to fit the reference spectra with the measured spectrum. An iterative process using singular value decomposition is used to perform this step. At each iteration, the fit is tested and non-significant reference spectra are removed. This allows successively deleting candidate isotopes in spectral region analysis based on statistical significance. Background subtraction is performed by choosing the long-term, background as one of the unknowns in the above step. This technique is also used to discriminate other sources which do not emit peaks, such as $^{90}$Strontium.

The present invention correlates the measured peak energy and relative peak intensity to standard published values in an isotope library. This combination of fully reduced information together with a novel modification to Gunnick and Niday methodology provides consistent, reliable identification even when the problem might otherwise seem indeterminate. Combinations of isotopes are also identified. Given the concise nature of the input feature set, the process also executes rapidly.

Algorithms, as previously described, are employed to reduce the raw data to a set of corrected peaks. The primary information in this set of data is peak energies and peak intensities as measured by peak area. The requirements for this stage of analysis is that the quality of the processing previously performed must be such that a known isotope must have peak energies and relative peak intensities that match published values for that isotope within a narrow tolerance. This permits analysis to be open to standard published values and facilitates the addition of new materials to the isotope library. It does not require complicated multiple full spectrum acquisitions under various shielding conditions that many threat identification algorithms require.

Each isotope in the isotope library is scanned and a match to the unknown sample is tested. The match test compares isotope peaks to sample peaks within a defined energy range that varies according to energy and sample intensity. Both energy correlation and intensity correlation are used to compute a correlation coefficient. The identification algorithm permits a correlation coefficient threshold that varies with the isotope. The isotope identification phase considers the case that some peaks defined in the isotope library may be obscured by other peaks due to the limited resolution of the NaI detector. A level of confidence is also associated with the match based on the correlation value.

The spectral region analysis is also used for Isotope Identification. A fit to a series of parameter models of spectral regions permit identification of low-level materials that have low photo-fractions, such as $^{238}$U and Plutonium (WGPu and RGPu).

It is possible that a single isotope sample may correlate to more than one isotope due to interferences in the isotope library and these are resolved using a modified version of Gunnick and Niday. This method was originally developed for a cooled high-resolution semiconductor detector and modification permits use in NaI detection systems. NaI detectors frequently result in an under-determined set of linear equations. This is caused by attempting to solve a linear system that has more unknowns than it has equations. Instead of finding a set of isotopes each of which will each satisfy the equations, the present invention adds additional equations to reduce the under-determination. The additional equations are based on isotope peaks that are present in the library and that are not observed in the sample. An additional equation is added for the sum of the missing peaks in each interference set as defined by the Gunnick and Niday method. The coefficients of equation are the negative sum of the branching intensities of each missing peak. Isotope resolution uses a singular value decomposition (SVD) method to solve a linear system of equations. This method is numerically more stable than other methods such as Gauss-Jordan elimination, and is more robust in situations when the equation set is under-determined.

A test of an exemplary embodiment of the present invention ran $^{133}$Barium just above the detection threshold (average of 111 counts), $^{226}$Radium at 1800 counts, and $^{235}$Uranium at 2400 counts. The identification accuracy (number correct/number of tests) was: Very Low Level $^{133}$Ba: 11/12 at 111 counts; $^{226}$Radium: 6/6 at 1800 counts; $^{235}$Uranium: 6/6 at 2400 counts. The identification accuracy depends on the isotope number of peaks, presence of interfering isotopes in the library, and total counts. With four detectors, the lowest detection level of 3 µCi $^{133}$Ba would produce 496 counts. At this count level the threat identification accuracy is estimated to exceed 92%. A slightly higher source activity of 10 µCi will result in a threat identification accuracy of 96%.

Having accurately identified the source material, the decision to alarm is based on a fully configurable table of thresholds of the relative peak intensities for the isotopes. The alarm threshold is defined for each isotope in the library. A typical threshold is 3000 counts for $^{40}$K (NORM), 300 counts for $^{60}$Co (Industrial), 500 counts for $^{131}$I (Medical), and 100 counts for WGPu (SNM), As an example, alarms can be triggered for NORM if concentrations of a specific isotope are suspiciously high. An overall "threat-level" threshold factor can also be applied if desired. An alarm is always triggered if any concentration of threat material is identified. Based on the set of matching metrics calculated in the identification process. High, Medium and Low confidence level is generated for the isotope match.

The final step of alarming the overall threat ID process involves summing all peak areas for each Identified isotope and comparing this to a threshold value. This threshold level is also variable by individual isotopes. Peaks that are not identified are compared to a threshold level Any peak above this level will cause a gamma alarm to be posted. The threat identification algorithms handle mixtures of isotopes since no assumptions are made on the number of isotopes or the manner in which isotopes and shielding conditions may be combined.

When an alarm is triggered, a full diagnostic data set is archived locally and also reported to the supervisory workstation. This includes all relevant algorithm parameters as well as the spectrum buffers. Alarming for neutrons is received directly from the neutron detection module and also reported to the supervisory computer with available parameters.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for radiation detection comprising:
   a radiation event detector;
   two spectroscopic buffers, one holding background data and one holding integrated detection event data received from the radiation event detector;
   means for precision peak identification that receives data from the two spectroscopic buffers and provides a list of corrected source peak locations and intensities;
   means for spectral region analysis that receives the detection event data;
   pattern recognition algorithms receiving data from the means for precision peak identification and means for spectral region analysis to identify a source isotope from a standard library; and,
   alarm means responsive to output from the pattern recognition algorithms upon exceeding a predetermined threshold for the source isotope.

2. A method for radiation detection comprising the steps of:
   providing a radiation event detector;
   receiving data from the radiation event detector in two spectroscopic buffers, one holding background data and one holding integrated detection event data;
   conducting precision peak identification on data from the two spectroscopic buffers including the steps of:
   detecting peaks using a filtered second order derivative of data from a modified Mariscotti filter that matches a Gaussian response of the radiation event detector while providing a variable filter width capability; and,
   discriminating peaks versus noise by the use of a standard deviation of the second derivative and,
   providing a list of corrected source peak locations and intensities;
   conducting spectral region analysis on the integrated detection event data;
   receiving data from the peak identification and spectral region analysis and applying pattern recognition algorithms to identify a source isotope from a standard library; and,
   triggering an alarm responsive to exceeding a predetermined threshold for the source isotope.

3. The method as defined in claim 2 wherein the step of conducting precision peak identification further includes the step of:
   obtaining a peak centroid by performing a centroid calculation using peak start and end channels from a set of filtered second derivative zero crossings.

4. The method as defined in claim 3 wherein the step of conducting precision peak identification further includes the steps of:
   determining location of additional peaks by using a centroid value of residuals.

5. The method as defined in claim 4 wherein the step of conducting precision peak identification further includes the steps of:
   selecting a subset of peaks along with an amount of baseline data on each side of the peaks, wherein said peak selection is based on detected peak positions and fixed energy resolution response of the detector and intensity, position, and width of neighboring peaks to ensure that the baseline data is not contaminated by peaks not in the current subset.

6. The method as defined in claim 5 wherein the step of conducting precision peak identification further includes the steps of:
   performing a linear regression based on Gaussian distributions to obtain an initial estimate of peak intensity; and,
   employing a cubic polynomial model for a baseline approximation.

7. The method as defined in claim 6 wherein the step of performing a linear regression is applied multiple times.

8. The method as defined in claim 6 wherein the step of conducting precision peak identification further includes the step of:
   applying a non-linear regression to the initial estimate of peak intensity using a baseline from the linear regression.

9. The method as defined in claim 8 wherein in the non-linear regression employs a Marquart-Levenberg algorithm.

10. The method as defined in claim 8 further comprising the steps of:
    summing residuals on shoulders of each peak and if the sum of the residuals exceeds a fraction of a peak area, detecting a mismatch to a Gaussian model and correcting the Gaussian model to add additional peaks, with location of the additional peaks determined by computing a centroid of the residuals;
    returning to the step of performing a linear regression with the additional peaks.

11. The method as defined in claim 10 further comprising the step of computing peak area by a Gaussian area formula using measured amplitude and peak width.

12. The method as defined in claim 6 wherein the step of performing a linear regression further comprises the steps of:
    obtaining (Step 1) a Low-weighted baseline; (Step 2) a peak model computed with the low-weighted baseline;

(Step 3) a High-weighted baseline; and (Step 4) a peak model computed with the high-weighted baseline wherein a baseline weight applied is the reciprocal of a sum of peak intensities up to a maximum value; and computing an estimated signal to noise ratio by dividing a smallest peak from Step 2 by a computed standard deviation of baseline residuals computed from Step 3 and if the signal to noise ratio is low, using the low-weighted baseline model from Step 1 with the peak model from Step 2 or, alternatively, if the signal to noise ratio exceeds a predetermined threshold using the baseline computed in Step 3 with the peak model from Step 4.

13. A method for radiation detection comprising the steps of:

providing a radiation event detector;

receiving data from the radiation event detector in two spectroscopic buffers, one holding background data and one holding integrated detection event data;

conducting precision peak identification on data from the two spectroscopic buffers by detecting peaks using a filtered second order derivative of data from a filter that matches a Gaussian response of the radiation event detector while providing a variable filter width capability;

discriminating peaks versus noise by the use of a standard deviation of the second derivative; and obtaining a peak centroid by performing a centroid calculation using peak start and end channels from the filtered second derivative zero crossings;

determining location of additional peaks by computing a centroid value of residuals;

selecting a subset of peaks along with an amount of baseline data on each side of the peaks, wherein said peak selection is based on detected peak positions and fixed energy resolution response of the radiation event detector and intensity, position, and width of neighboring peaks to ensure that baseline data is not contaminated by peaks not in the selected subset;

performing a linear regression based on Gaussian distributions to obtain an initial estimate of peak intensity by obtaining (Step 1) a Low-weighted baseline; (Step 2) a peak model computed with the low-weighted baseline; (Step 3) a High-weighted baseline; and (Step 4) a peak model computed with the high-weighted baseline wherein a baseline weight applied is the reciprocal of a sum of peak intensities up to a maximum value; and computing an estimated signal to noise ratio by dividing a smallest peak from Step 2 by a computed standard deviation of baseline residuals computed from Step 3 and if a signal to noise ratio is low, using the Low-weighted baseline model from Step 1 with the peak model from Step 2 or, alternatively, if the signal to noise ratio exceeds a predetermined threshold using the High-weighted baseline computed in Step 3 with the peak model from Step 4; and, employing a cubic polynomial model for a baseline approximation;

applying a non-linear regression to the initial estimate of peak intensity using the baseline approximation from the linear regression;

computing peak area by a Gaussian area formula using measured amplitude and peak width;

summing the residuals on shoulders of each peak and if the sum of the residuals exceeds a fraction of the peak area, detecting a mismatch to a Gaussian model and correcting the model to add additional peaks, location of the additional peaks determined by a computed centroid of the residuals;

returning to the step of performing a linear regression with the additional peaks;

and providing a list of corrected source peak locations and intensities;

conducting spectral region analysis on the integrated detection event data;

receiving data from the peak identification and spectral region analysis and applying pattern recognition algorithms to identify a source isotope from a standard library; and, triggering an alarm responsive to exceeding a predetermined threshold for the source isotope.

14. The method of claim 13 wherein in the non-linear regression employs a Marquart-Levenberg algorithm.

15. The method of claim 13 wherein the filter matching Gaussian response is a modified Mariscotti filter.

16. The method of claim 13 where in the step of conducting spectral region analysis further includes adding a background set as an unknown variable in spectral region analysis.

17. The method of claim 13 wherein the step of conducting spectral region analysis further includes successively deleting candidate isotopes in spectral region analysis based on statistical significance.

* * * * *